United States Patent [19]

Kobayashi et al.

[11] 4,326,422

[45] Apr. 27, 1982

[54] PROBE UNIT OF A FLUID FLOW RATE MEASURING APPARATUS

[75] Inventors: Hiroshi Kobayashi, Yokohama; Toru Kita, Yokosuka, both of Japan

[73] Assignee: Nissan Motor Co., Yokohama, Japan

[21] Appl. No.: 197,699

[22] Filed: Oct. 16, 1980

[30] Foreign Application Priority Data

Oct. 17, 1979 [JP] Japan ................................ 54-132909

[51] Int. Cl.$^3$ ................................................ G01F 1/32

[52] U.S. Cl. .................................................. 73/861.22

[58] Field of Search .............................. 73/861.22, 204

[56] References Cited

U.S. PATENT DOCUMENTS 4,257,276 3/1981 Kita et al. ........................ 73/861.22

FOREIGN PATENT DOCUMENTS 55-66713 5/1980 Japan ................................ 73/861.22

55-124014 9/1980 Japan ................................ 73/861.22

*Primary Examiner*—Charles A. Ruehl

*Attorney, Agent, or Firm*—Schwartz, Jeffery, Schwaab, Mack, Blumenthal & Koch

[57] ABSTRACT

Two metal rods about which a hot wire is wound are projected into a slot of a vortex generating body in which slot alternating fluid flow caused by shedding of vortexes occurs. One end of the hot wire is connected to one of the metal rods and the other end of the hot wire is connected to the other metal rod to enable the metal rods to act as terminal elements.

5 Claims, 6 Drawing Figures

34a
34b
30
32
10
26
34a-1
34b-1
28
19
19
20
III
III

PROBE UNIT OF A FLUID FLOW RATE MEASURING APPARATUS

FIELD OF THE INVENTION

The present invention relates in general to a fluid flow rate measuring apparatus and more particularly to a probe unit of a fluid flow rate measuring apparatus to which the theory of "Karman vortex street" is practically applied.

BACKGROUND OF THE INVENTION

It is known that, under certain conditions, a "Karman vortex street" is shed in the wake of a bluff body when a flow of fluid is perpendicular to the body. The shedding of vortexes occurs periodically first from one side of the body and then from the other in accordance with the velocity of the flow. Thus, by measuring the number of the vortexes created by the body in a unit time, the flow rate of the fluid can be detected. Hitherto, a number of fluid flow rate measuring apparatus has been proposed by putting the above theory into practical use.

SUMMARY OF THE INVENTION

According to the present invention, there is provided a probe unit of a fluid flow rate measuring apparatus to which the theory "Karman vortex street" is practically applied. The probe unit comprises a vortex generating body arranged to lie across the fluid stream substantially at right angles to the flow direction of the fluid, the body being formed with a first slot which extends therethrough substantially perpendicular with respect to the flow direction of the fluid, the body being further formed with a second slot which extends from the top of the body and opens the middle portion of the first slot to be merged therewith, an electrically insulating plug member tightly disposed in the second slot, the plug member being formed with two through openings, two metal rods which are put through the two through openings of the plug member in such a manner that upper portions of the metal rods are projected sufficiently from the plug member and lower sections of same are projected into the middle portion of the first slot, a hot wire wound round the lower sections of the metal rods, one end of the hot wire being connected to one of the metal rods and the other end of the wire being connected to the other of the metal rods, and means for electrically insulating the hot wire from the metal rods except the portions of the metal to which the ends of the hot wire are connected.

It is an object of the present invention to provide a probe unit of a fluid flow rate measuring apparatus, which is simple in construction.

It is another object of the present invention to provide a probe unit of a fluid flow rate measuring apparatus, in which mounting of a vortex detector to a vortex generator is readily made.

BRIEF DESCRIPTION OF PRIOR ART

Figure 1:
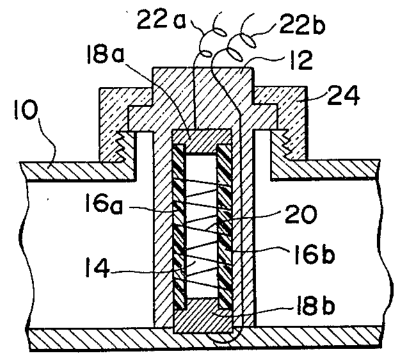
FIG. 1 is a sectional view of a conventional probe unit of the fluid flow rate measuring apparatus to which the theory of "Karman vortex street" is practically applied, the probe unit being disposed in a duct through which a fluid to be measured flows.

In order to clarify the invention, a conventionally used fluid flow rate measuring apparatus to which the theory "Karman vortex Street" is partically applied will be outlined with reference to FIG. 1.

Referring to FIG. 1, there is shown in a sectional manner a probe unit of the conventional apparatus. The probe unit is arranged to lie across a duct 10 through which a fluid to be measured flows. The probe unit shown comprises a vortex generating body 12 which lies in the duct 10 to be perpendicular to the fluid flow. The body 12 has a slot 14 which extends therethrough substantially perpendicular with respect to the flow direction of the fluid.

Within the slot 14, at the middle section thereof, is located a vortex detector. The vortex detector comprises a pair of spaced supporting rods *16a* and *16b* of electrically insulating material which are tightly sandwiched by two terminal members *18a* and *18b* of electrically conductive material. A hot wire 20, that is bared wire having a suitable electric resistance, is wound round the supporting rods *16a* and *16b* with both ends thereof connected to the terminal members *18a* and *18b*, respectively. Two lead wires *22a* and *22b* extend from the respective terminal members *18a* and *18b* to a known control circuit by which the information signals from the hot wire 20 is treated for preparing practically applicable instruction signals. Denoted by numeral 24 is a connector for detachably connecting the probe unit to the duct 10.

In operation, the hot wire 20 is supplied with current from an electric power source (not shown) to be heated. Under flowing of the fluid in the duct 10, the wire 20 thus heated is cooled in proportion to the flow velocity of the fluid alternately flowing through the slot 14 caused by shedding of vortexes which occurs periodically first from one side of the body 12 and then from the other side. The cooling of the hot wire 20 lowers the electric resistance thereof, resulting in a drop of voltage applied thereto. The voltage variation of the hot wire 20 thus made is treated by the control unit for preparing the practically usable instruction signals concerning the flow rate of the fluid in the duct 10.

In the conventional probe unit mentioned above, however, the electric connection between the hot wire 20 and the control unit (not shown) is made by means of the terminal members *18a* and *18b* which are embedded in the vortex generating body 12 and the lead wires *22a* and *22b* each of which has a section piercing the body 12. Such electrical connection causes not only complicated construction of the probe unit but also poor productivity of the same.

DETAILED DESCRIPTION OF THE INVENTION

Elimination of the above-mentioned drawback encountered in the conventional probe unit is an essential object of the present invention.

Figure 2:
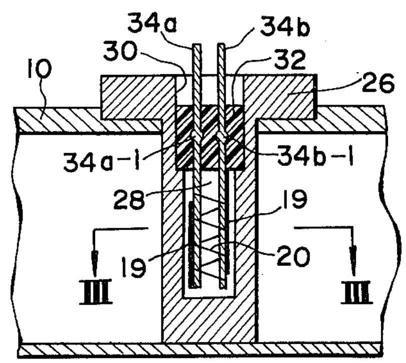
FIG. 2 is a view similar to FIG. 1, but showing an improved probe unit according to the present invention.
Figure 3:
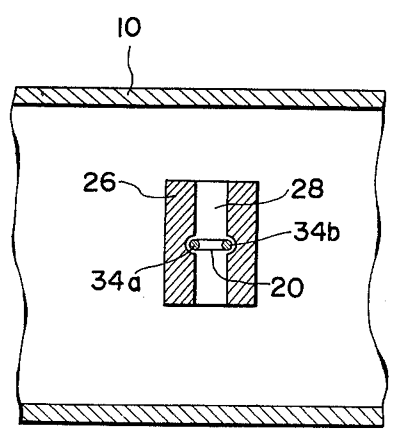
FIG. 3 is a sectional view taken along the line III—III of FIG. 2.

Referring to FIGS. 2 and 3, there is shown an improved probe unit of the present invention, as being arranged to lie in the duct 18. The probe unit comprises a vortex generating body 26 which lies across the duct 10 to be perpendicular to the fluid flow. The vortex generating body 26 has an horizontal slot 28 (or first slot) which extends therethrough substantially perpendicular with respect to the flow direction of the fluid flowing through the duct 10. As will be seen from FIG. 2, the vortex generating body 26 further has at its upper section a vertical slot 30 (or second slot) which extends from the upper surface of the body 20 to the top of the horizontal slot 28 to be merged with the slot 28. It should be noted that the vertical slot 30 opens to the middle section of the horizontal slot 28. As will be noted from FIG. 3, the middle section of the horizontal slot 20 is enlarged slightly.

Tightly disposed in the vertical slot 30 is a plug 32 which is constructed of electrically insulating material such as insulating plastics or the like. A pair of spaced metal rods 34*a* constructed of for example nickel are put through holes (no numerals) formed in the plug 32 in such a manner that the upper sections of the rods 34*a* and 34*b* are projected sufficiently from the top of the vortex generating body 26 and the lower sections of the same are projected into the enlarged section of the horizontal slot 28. As will be seen from FIG. 3, the metal rods 34*a* and 34*b* are arranged in the slot 28 to provide adequate clearance therebetween in order not to disturb the alternating fluid flow in the slot 28. Now, it should be noted that if the vortex generating body 26 is constructed of an electrically conductive material, attention should be paid not to contact the metal rods 34*a* and 34*b* to the body 26. Preferably, the metal rods 34*a* and 34*b* are formed with respective enlarged portions 34*a*-1 and 34*b*-1 at portion embedded in the plug 32 in order to assure tight connection between the metal rods 34*a* and 34*b* and the plug 32. The lower sections of the metal rods 34*a* and 34*b*, that is the sections projected into the horizontal slot 28, are coated with electrically insulating material 19. A hot wire 20 is wound round the insulating material coated lower sections of the metal rods 34*a* and 34*b*. One end of the hot wire 20 is welded to the metal rod 34*a* and the other end of the same is welded to the other metal rod 34*b* to enable the metal rods 34*a* and 34*b* to act as terminal elements.

In production of the probe unit of the invention, the following steps are taken.

First, the two metal rods 34*a* and 34*b* having the respective enlarged sections 34*a*-1 and 34*b*-1 are prepared. By using a plastic moulding technique, a moulded plug 32 is prepared with the enlarged portions 34*a*-1 and 34*b*-1 of the metal rods 34*a* and 34*b* embedded therein. After the lower sections of the metal rods 34*a* and 34*b* are coated with the electrically insulating material 19, one end of the hot wire 20 is welded to the metal rod 34*a* at a portion where the insulating material 19 is not applied. By rotating the plug 32 about its axis, the hot wire 20 is wound round the lower sections of the metal rods 34*a* and 34*b* at a constant pitch. Then, the other end of the hot wire 20 is welded to the other metal rod 34*b* at a portion where the insulating material is not applied. If desired, after completion of these steps, application of the insulating material 19 to the lower sections of the metal rods 34*a* and 34*b* may be additionally made for achieving tight fixing of the hot wire 20 to the rods 34*a* and 34*b*. The assembled unit comprising the plug 32, the metal rods 34*a* and 34*b* and the hot wire 20 is mounted to the vortex generating body 26 by snugly inserting the plug 32 into the vertical slot 30.

Figure 4:
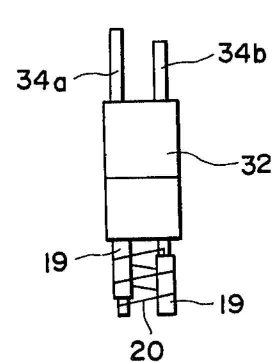
FIGS. 4 and 5 are front and side views of a vortex detector of an alternative probe unit according to the present invention.
Figure 5:
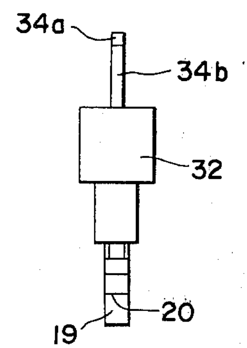
Figure 6:
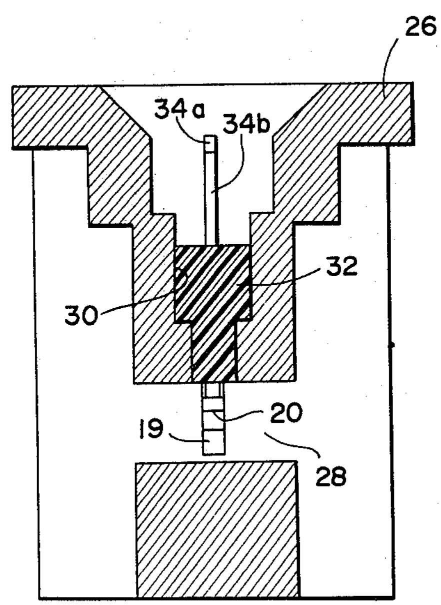
FIG. 6 is a sectional view of the alternative probe unit in which the vortex detector of FIGS. 4 and 5 is disposed.

Referring to FIGS. 4, 5 and 6, there is shown an alternative probe unit of the present invention, in which drawings, similar parts to those of FIGS. 2 and 3 are designated by the same numerals. In this alternative probe unit, the upper sections of the metal rods 34*a* and 34*b* have different lengths and the plug 32 is constructed to have larger and smaller sections. The vertical slot 30 of the vortex generating body 26 is constructed to have a stepped portion to match the shape of the plug 32. With the upper sections of the metal rods 34*a* and 34*b* different in length, plugging a connector (not shown) to the rods is facilitated as compared with the case of the probe unit to FIGS. 2 and 3.

From the foregoing description, it will be appreciated that according to the present invention, simple construction of the probe unit is achieved because of using the metal rods 34*a* and 34*b* as not only hot wire supporters but also terminal elements. This invention eliminate the need for the lead wire receiving passages of the vortex generating body used in prior art probe unit of FIG. 1. With the lead wire receiving passages omitted, good productivity of the probe unit is expected. Further, those skilled in the art will appreciate the ease with which the vortex detector including the metal rods 34*a* and 34*b*, the hot wire 20 and the plug 32 is mounted to the vortex generating body 26.

What is claimed is:

1. A probe unit of a fluid flow rate measuring apparatus, comprising:

a vortex generating body arranged to lie across the fluid stream substantially at right angles to the flow direction of said fluid, said body being formed with a first slot which extends therethrough substantially perpendicular with respect to the flow direction of said fluid, said body being further formed with a second slot which extends from the top of said body and opens to the middle portion of said first slot to be merged therewith;

an electrically insulating plug member tightly disposed in said second slot, said plug member being formed with two through openings;

two metal rods which are put through said two through openings of said plug member in such a manner that upper portions of said metal rods are projected sufficiently from said plug member and lower sections of said metal rods are projected into the middle portion of said first slot;

a hot wire wound around said lower sections of said metal rods, one end of said hot wire being connected to one of said metal rods and the other end of same being connected to the other of said metal rods; and means for electrically insulating said hot wire from said metal rods except the portions of said metal rods to which the ends of said hot wire are connected.

2. A probe unit as claimed in claim 1, in which the middle portion of said first slot is enlarged where said lower sections of said metal rods are located.

3. A probe unit as claimed in claim 1, in which each of said metal rods is formed at its portion to be embedded in the plug member with an enlarged section.

4. A probe unit as claimed in claim 1, in which the upper sections of said metal rods have different lengths.

5. A probe unit as claimed in claim 1, in which said means is an electrically insulating material which is coated on said lower sections of said metal rods.

* * * * *